UNITED STATES PATENT OFFICE.

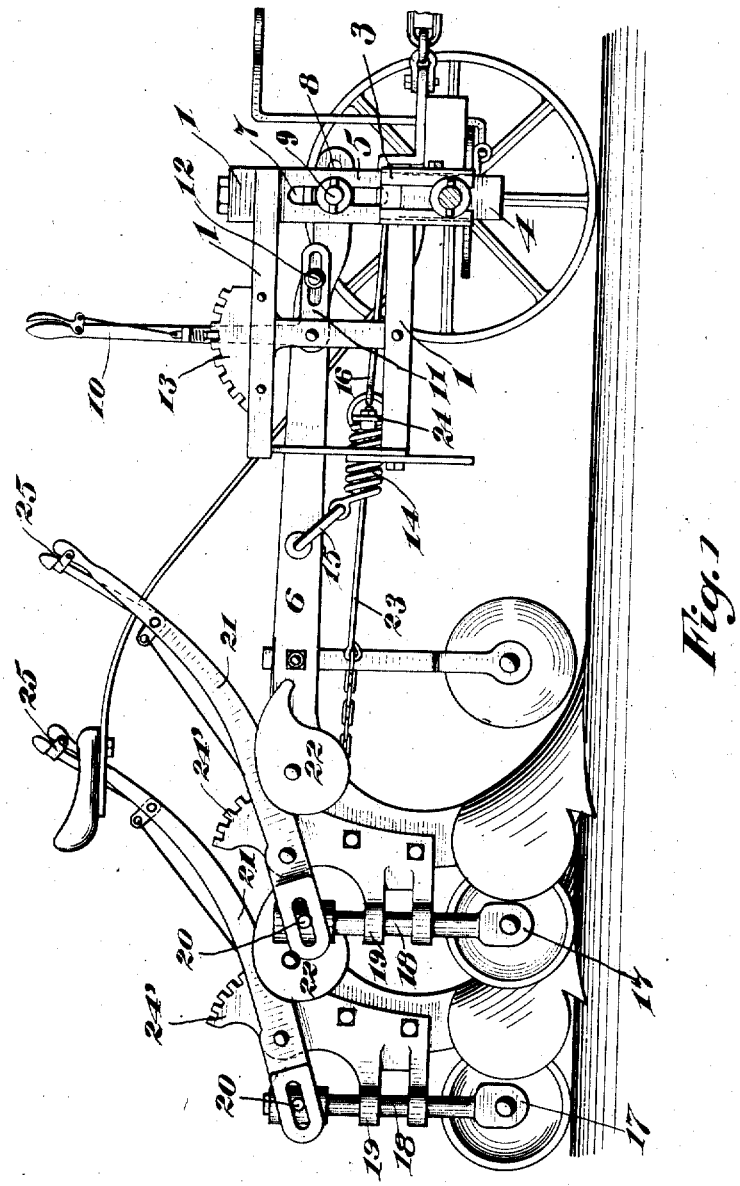

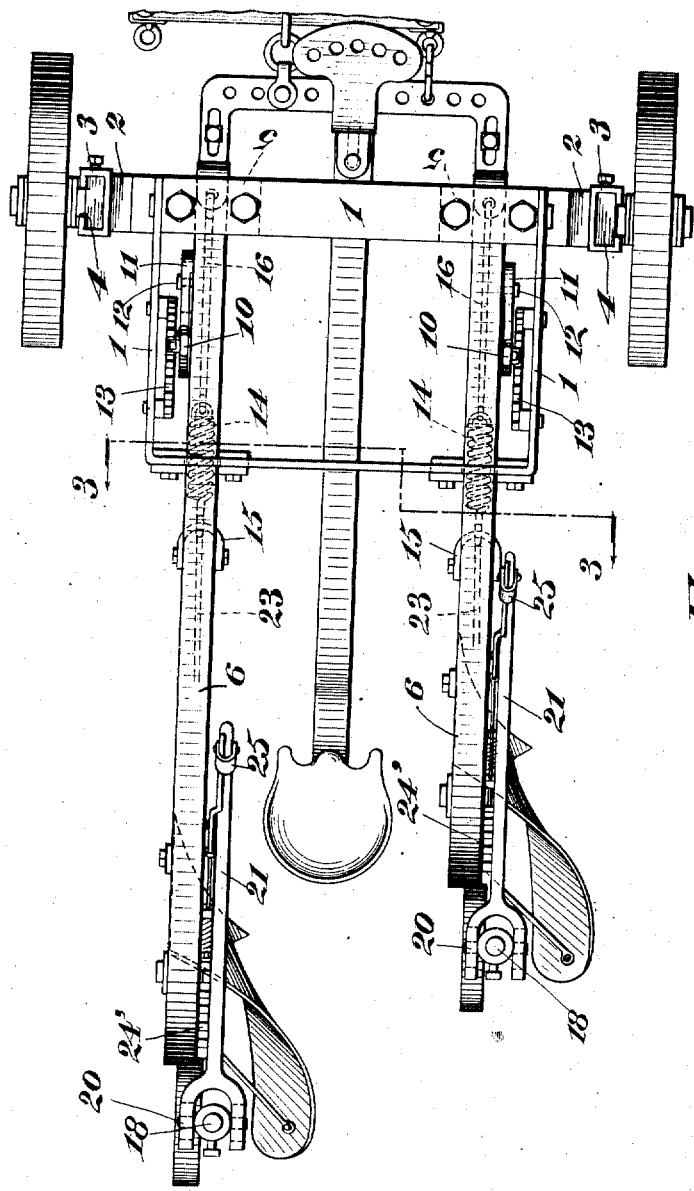

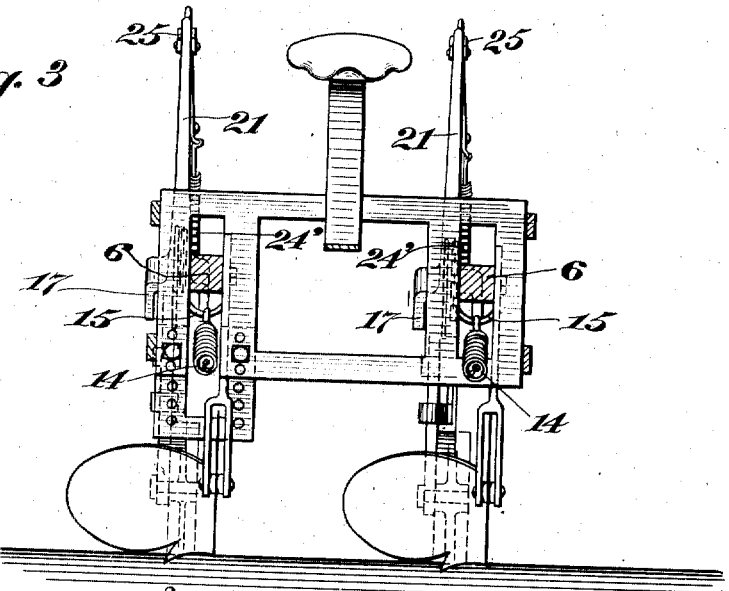
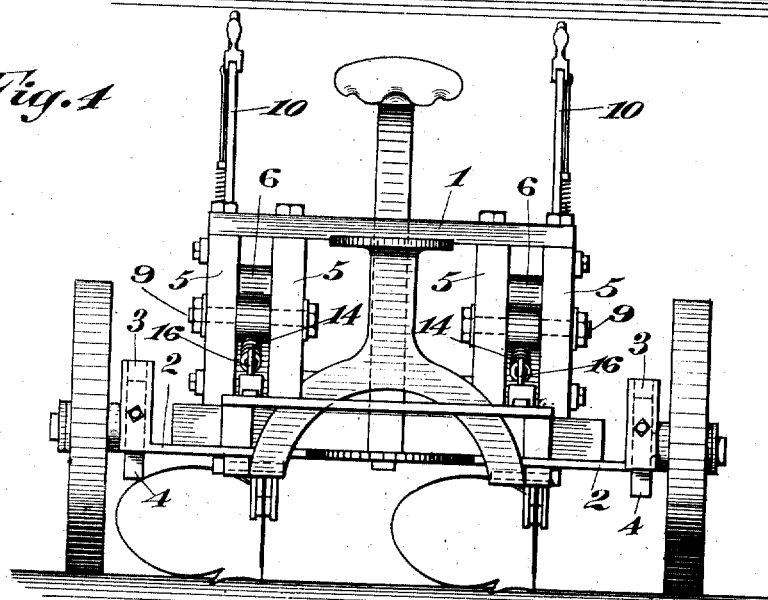

JEAN LANGLOIS, OF MOLINE, ILLINOIS.

GANG-PLOW.

990,885.  Specification of Letters Patent.  Patented May 2, 1911.

Application filed July 27, 1910. Serial No. 574,096.

*To all whom it may concern:*

Be it known that I, JEAN LANGLOIS, a subject of Great Britain, residing at Moline, in the State of Illinois, one of the United States of America, have invented certain new and useful Improvements in Gang-Plows; and I do hereby declare that the following is a full, clear, and exact description of the invention, such as will enable others skilled in the art to which it appertains to make and use the same.

The invention to be hereinafter described relates to gang plows, and more particularly to gang plows of the individually adjustable plow type.

Broadly speaking, it comprises a wheeled supporting frame, plow beams loosely and adjustably connected thereto, yielding means for maintaining said beams in a forward position, plowshares carried by the beams, means for automatically raising the rear end of a plow beam whenever its share strikes an obstacle, and manually operable means for raising the plowshare in inoperative position.

In order to more clearly disclose the construction, operation and use of the invention, reference should be had to the accompanying drawings forming part of the present application.

Throughout the several figures of the drawings, like reference characters designate the same parts.

In the drawings: Figure 1 is a side elevation of the invention, in operative position; Fig. 2 is a plan view of the machine; Fig. 3 is a vertical cross section on line 3—3 of Fig. 2, looking in the direction of the arrow; and Fig. 4 is a front view.

Referring to the drawings in detail, 1 indicates a framework. From the frame 1 extend the arms 2, provided with vertical guides or boxes 3. In these boxes are slidably mounted blocks 4, carrying stub axles for the supporting wheels. These blocks may be adjusted to any desired vertical position and then securely locked or clamped by thumb nuts or like means.

The uprights 5 of the frame 1 are arranged in pairs forming a guideway for the forward ends of the plow beams 6. To provide a positive, and at the same time adjustable connection between the ends of the beams 6 and the frame 1, the uprights are provided with vertical slots 7, and the beams are provided with longitudinal slots 8. A bolt or pintle 9 is passed through the slots in the upright and in the plow beam. The bolt or pintle may be headed, or washers may be used, to keep it in operative position. This connection, as shown in Fig. 1, allows both vertical and longitudinal movement of the beam 6 relatively to the supporting frame.

In order to adjust the individual beams 6 vertically to regulate the draft of the plowshare, a hand-lever 10 has been provided. This lever is pivoted on the frame 1 and provided with a slotted arm 11 adapted to freely receive a pin 12 connected to the beam 6. This lever is provided with the usual spring catch adapted to selectively engage notches in the arc plate 13 secured to the frame 1. In this way, the beam 6 may be held in any desired vertically adjusted position. By swinging the lever 10 rearwardly, the beam end may be raised, and by swinging it forward the beam may be lowered.

The beam 6 is held normally in its forward position, with the pintle 9 seated in the rear of the slot 8, by means of a coil spring 14. This coil spring is connected at one end to the plow beam by means of a hook, ring, or the like device 15, and at its opposite end to the frame 1 by a rod 16. Consequently, whenever a plowshare strikes an obstruction, it will stop momentarily, while the frame 1 continues. It is necessary, of course, to provide means for turning such plowshare out of the way of the obstruction as soon as the obstruction is met. To this end, a hoisting roller or wheel 17 is provided. This wheel is carried by a rod 18 mounted to slide vertically in sleeves or bearings 19 secured to the rear end of the beam 6. The upper end of the rod 18 is provided with pins 20 adapted to travel freely in slots in the lower bifurcated end of the hand lever 21, which normally rests upon a cam 22 pivoted to the plow beam 6 above the plowshare. This cam is connected by chain and rod 23 to the spring 14, the rod 23 being provided with a head 24 adapted to rest upon the end coil of the spring. Consequently, as soon as an obstacle is met and the spring 14 distended, the rod 23 and chain will rotate the cam 22. As the cam rotates, its peak will engage the lever 21 and gradually force it up and the roller 17 down. As the roller 17 is forced down, the plowshare, of course, will be raised, thus avoiding the obstruction encountered.

In order to allow manual adjustment of the individual plowshares, each lever 21 is provided with the usual spring catch adapted to engage notches in an arc plate 24'. These catches may be rendered inoperative by means of a clip 25 secured to the lever grip and adapted to engage the catch lever and hold it at such position as to retain the catch disengaged from the notches of the arc plate 24'.

It is thought that the operation of the invention will be clear from the preceding detailed description.

Changes may be made in the construction, arrangement and disposition of the several parts of the invention, without in any way departing from the field and scope of the same, and it is meant to include all such within this application, wherein only a preferred form has been disclosed.

Having thus fully described my invention, what I claim as new and desire to secure by Letters Patent, is:—

1. In combination with a gang plow of the character described, a framework provided with slotted uprights, plow beams provided with longitudinal slots, pins adapted to be passed through the slots in the uprights and the slots in the plow beams to loosely connect the plow beams with the aforesaid frame, yielding means adapted to hold the plow beams in their forward positions, cams carried by said plow beams, connections between the aforesaid framework and said cams whereby the cams are actuated by movement of said framework relatively to said plow beams, lifting rollers, and means adapted to be operated by said cams to actuate said lifting rollers.

2. In combination with a gang plow of the character described, a framework provided with slotted uprights, plow beams provided with longitudinal slots, pins adapted to be passed through the slots in the uprights and the slots in the plow beams to loosely connect the plow beams with the aforesaid frame, yielding means adapted to hold the plow beams in their forward positions, cams carried by said plow beams, connections between the aforesaid framework and said cams whereby the same are actuated by movement of said framework relatively to said plow beams, lifting rollers, means adapted to be operated by said cams to actuate said lifting rollers, and means for adjusting said plow beams to effect desired draft of the shares carried thereby.

3. In combination with a gang plow of the character described, a framework provided with slotted uprights, plow beams provided with longitudinal slots, pins adapted to be passed through the slots in the uprights and the slots in the plow beams to loosely connect the plow beams with the aforesaid frame, yielding means adapted to hold the plow beams in their forward positions, cams carried by said plow beams, connections between the aforesaid framework and said cams whereby the same are actuated by movement of said framework relatively to said plow beams, lifting rollers, means adapted to be operated by said cams to actuate said lifting rollers, means for adjusting said plow beams to effect desired draft of the shares carried thereby, and means for locking said adjusting means in operative position.

4. A gang plow of the character described comprising a supporting frame, plow beams mounted to have limited longitudinal movement therein, vertically movable lifting rollers mounted on the rear of said beams, levers for operating said rollers, and means for automatically actuating said levers as the plow beams move rearwardly.

In witness whereof I have hereunto set my hand in the presence of two witnesses.

JEAN LANGLOIS.

Witnesses:
C. SPEIDEL,
C. HELLPENSTELL.